United States Patent [19]

DeLuca

[11] 3,772,621

[45] Nov. 13, 1973

[54] MANUALLY ACTUABLE SOLENOID OPERATED SWITCH APPARATUS

[75] Inventor: Paul V. DeLuca, Port Washington, N.Y.

[73] Assignee: Porta Systems Corp., Roslyn, N.Y.

[22] Filed: Sept. 22, 1972

[21] Appl. No.: 291,355

Related U.S. Application Data

[62] Division of Ser. No. 50,248, June 26, 1970, Pat. No. 3,700,824.

[52] U.S. Cl. ....................... 335/186, 335/1, 335/164

[51] Int. Cl. ............................................. H01h 3/02

[58] Field of Search ........................ 335/1, 164, 186; 200/42 R, 61.59; 292/144, 201; 70/279, 282

[56] References Cited

UNITED STATES PATENTS 2,966,568 12/1960 Root et al. .......................... 335/164

*Primary Examiner*—Harold Broome

*Attorney*—Philip D. Amins

[57] ABSTRACT

A manually actuable solenoid operated switch apparatus especially for use in conjunction with cutover transition apparatus for effecting transitional switching of telephone subscriber lines. The solenoid operated switch apparatus comprises a base portion housing a plurality of contact pairs and a coil wound solenoid, a frame which includes an opening formed in the top portion thereof with the opening disposed in superposed spaced coaxial relationship with the solenoid. A spacer member is positioned between the top portion of the frame and a cover member which is secured to the frame. The cover and spacer members are provided with openings formed therein which are in coaxial alignment with the opening formed in the top portion of the frame and a dust cover is interposed between the top portion of the frame and the spacer member in surrounding relationship to the coaxial openings thereof. A separable key member is provided for insertion into the aforementioned coaxially aligned openings by piercing said dust cover thereby causing manual activation of the solenoid and actuation of said contact pairs, whereinafter rotational movement of said key member effects locking engagement thereof with said cover member and continued manual activation of said solenoid.

8 Claims, 5 Drawing Figures

MANUALLY ACTUABLE SOLENOID OPERATED SWITCH APPARATUS

BACKGROUND OF THE INVENTION

The present application is a Division of my previously filed application Ser. No. 50,248, filed June 26, 1970 for CUTOVER TRANSITION SWITCHING APPARATUS AND METHOD FOR TELEPHONE OFFICE EQUIPMENT, now U.S. Pat. No. 3,700,824.

Heretofore, telephone offices replacing panel, crossbar and step-by-step switching systems with the new electronic switching systems (E.S.S.) have resorted to what may best be described as a manual method of effecting transition which was crude, highly time consuming and irreversible, whereby any malfunction of the E.S.S. would have resulted in subscribers loss of service and which could have resulted in serious problems to the telephone office effecting the transition or cutover. While the individual telephone offices were readily aware of the problems which could arise, they were unable to provide an effective solution for the efficient transition of the systems. Thus, the actual cutover was always scheduled for the early hours of the morning when subscriber usage was at a minimum. The cutover was then manually effected by actually cutting the subscriber connections to the existing switching system after which the E.S.S. was activated. Since the number of subscribers connected to the existing switching system is normally 10,000, although in various systems the number of subscriber lines may vary from less than 10,000 to about 40,000 lines, the number of men required to cut the actual lines was considerable and the time required therefor was approximately one half hour and, of course, during the transitional cutover period there was no service available to the subscriber after the cutting of the lines until the E.S.S. was activated. Moreover, if any subscriber encountered an emergency situation or was actually engaged in emergency conversations, such as doctors or hospitals, their service would be interrupted during the cutover period. Thus, severe end results were possible with this mode of operation. Furthermore, should the E.S.S. be inoperative upon initial activation thereof, the loss of subscriber service could be extended for hours rather than minutes since the cutover procedure was irreversible in that the subscriber's line connections to the existing switching system was physically destroyed. Thus, subscriber service was unilaterally dependent upon the successful operation of the E.S.S. equipment immediately upon initial activation thereof.

SUMMARY OF THE INVENTION

Accordingly, it is the primary object of the present invention to provide a new and novel apparatus and method for effecting electrical cutover transition of early generation telephone switching systems to new generation telephone switching systems which switching systems are normally located in central telephone offices.

It is a more particular object of the present invention to provide a new and novel apparatus and method for effecting electrical cutover transition from panel, crossbar and step-by-step telephone switching systems to similar type systems or to electronic telephone switching systems.

It is another object of the present invention to provide a method and apparatus as aforedescribed which permits the selective and reversible connection of the subscriber lines, in the telephone office, to either the new generation or existent generation switching system.

It is a further object of the present invention to provide an electrical cutover transition apparatus which is reusable, whereby the apparatus after effecting a cutover transition at one time may be disconnected, stored and reused for another cutover transition at a subsequent time.

It is still another object of the present invention to provide a new and novel electrical cutover transition apparatus and method for interim and temporary disconnection of an old generation switching system to which subscribers lines are connected to permit connection thereof to a new generation switching system after which time the subscribers lines are permanently disconnected from the old generation switching system.

It is yet another object of the present invention to provide a method and apparatus of the aforementioned type which permits the disconnection of 10,000 to 40,000 subscriber lines from the old generation switching system and the connection thereof to the new generation switching system in less than one and one-half minutes; and for the eventuality of disconnection from the new generation system and reconnection to the old generation system, if needed, in less than one and one-half minutes.

It is still another object of the present invention to employ a new and novel relay switching mechanism which has a fail-safe operating mechanism which will permit manual override of the relay switching mechanism in the event of electrical failure thereof, thereby ensuring the electrical cutover transition of the switching systems.

BRIEF DESCRIPTION OF THE DRAWINGS

The foregoing and other objects, features and advantages of the present invention will become more apparent from the detailed description hereinafter considered in conjunction with the accompanying drawings wherein.

DETAILED DESCRIPTION OF THE PREFERRED EMBODIMENTS

Figure 1:
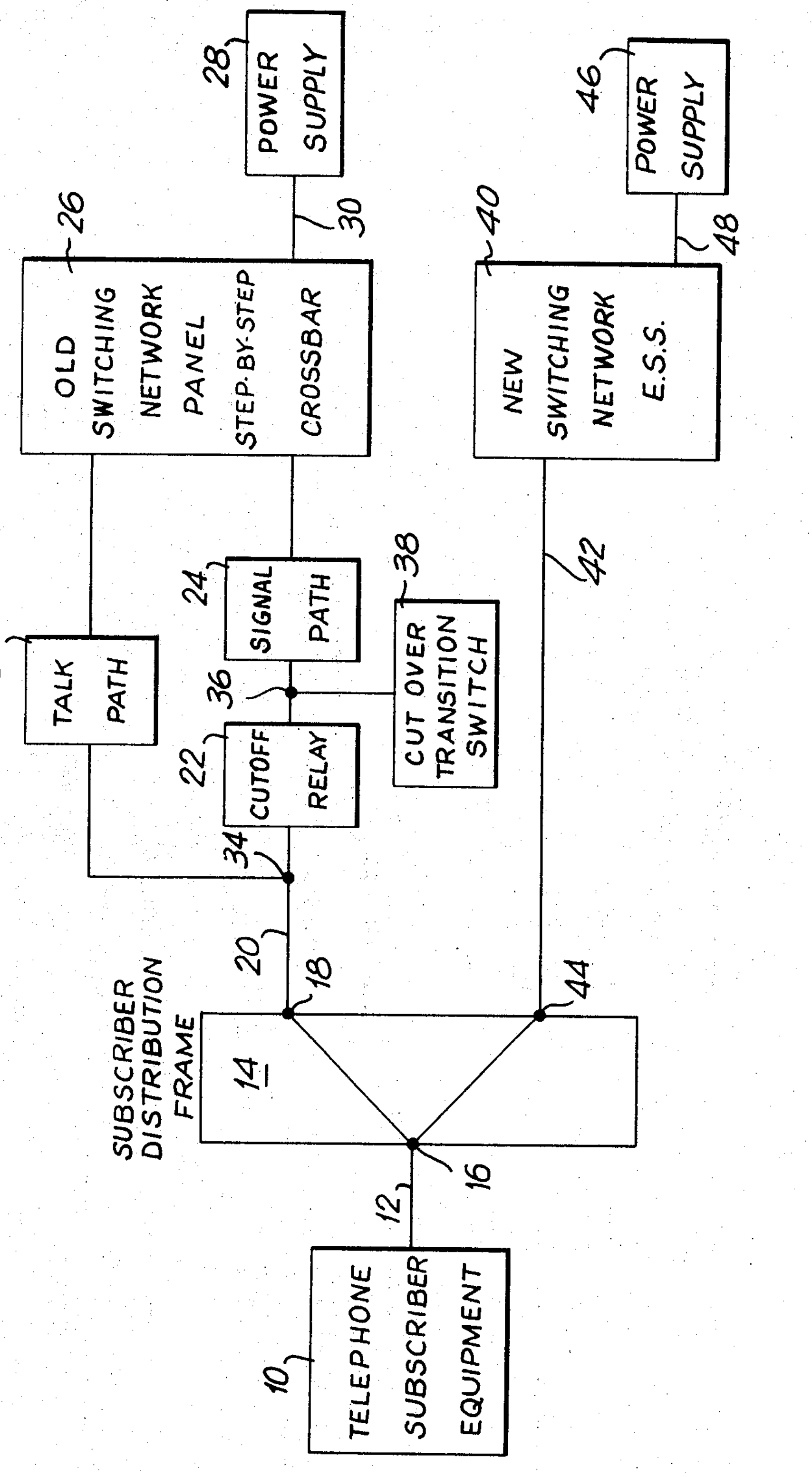
FIG. 1 is a block diagram of the preferred embodiment of the invention illustrative of the method and apparatus for effecting the cutover transition from an old switching network to a new switching network embodying the principals of the present invention.

Referring now to the drawings and more particularly to FIG. 1 thereof, there is shown a block diagram which generally illustrates the cutover transition method and apparatus of the present invention.

The telephone subscriber equipment denoted 10 is connected via line 12 to the subscriber distribution frame 14 at a junction 16. The frame 14 is located within a central telephone office while the line 12 actually represents thousands of lines connected to the frame 14. In this regard the equipment 10 actually represents thousands of individual telephone subscriber sets.

The frame 14 has a multitude of internal connections which effectively has an output junction 18 which is connected via a line 20 to a cutoff relay or hold magnet 22 and then through a signal path denoted 24 to an existent switching network or system denoted as the old switching network, generally designated by the reference numeral 26. The network 26 is powered by means of a power supply 28 connected thereto via a connection path 30. The switching network 26 is also connected to the line 20 and, thus the junction 18, via a talk path 32 which terminates at the line 20 at a junction 34. The talk path 32 is connected in parallel across the series combination of the cutoff relay 22 and the signal path 24. Connected between the cutoff relay 22 and signal path 24 at junction 36, is the cutover transition switch 38 whose construction and function will be discussed in detail hereinafter.

The new switching network which is preferably an electronic switching system (E.S.S.) is generally designated by the reference numeral 40 and is connected via a line 42 to a junction 44 on the subscriber distribution frame 14. The E.S.S. 40 has a power supply 46 connected thereto via a connection path 48.

It is herein to be noted that all of the above elements with the exception of the subscriber equipment 10 and the lines 12 are located within the central telephone office. Moreover, while the old switching network 26 is in operation, the E.S.S. network 40 is maintained in a disconnected mode from the frame 14, although for test purposes it can receive the traffic flowing through frame 14 without affecting the same or the handling thereof by the operating network 26. Also, with network 26 operative, the cutover transition switch 38 is maintained in an inactivated condition.

In the normal operation of the equipment employing the network 26, a subscriber picks up his headset and dials the number desired. The signal is then transmitted via line 12 to the frame 14, to junction 18 and then via line 20 to the normally closed cutoff relay 22 and signal path 24 to the switching network 26. During this period of time the talk path 32 is maintained open circuited so there is no possible signal transmission therethrough. After the signal is fed to switching network 26 for connection to the called number, the cutoff relay 22 is activated by means of the network 26 and placed in an open condition, concomitantly with which the talk path 32 is closed. Thus, the junction 18 and, therefore the subscriber, is connected to network 26 only through talk path 32 for oral communication with the party at the called number. The activation of cutoff relay 22 prevents any further signal transmission through signal path 24 either from or to the subscriber originating the call. Similarly, the called subscriber will receive a ringing signal via his normally closed cutoff relay 22 which when he raises his headset to answer the call will cause activation of the relay 22 to an open position and connect his lines to a switching network via a talk path 32.

When the subscriber originating the call replaces the headset in the cradle, the talk path 32 will once more be open circuited while the cutoff relay 22 will become deactivated once again assuming its normally closed position, whereby the subscriber is once again in an operating mode which permits him to either originate or receive a call.

In order to facilitate the cutover transition from the old switching network 26 to the new switching network 40, it is still deemed advisable to perform the same in the early hours of the morning, preferably on a weekend, when the traffic (the number of subscribers using the equipment) is at a minimum.

The transition cutover is effected in accordance with the method of the present invention by activating the cutover transition switch 38 which in turn activates the cutoff relay 22 causing it to be switched from its normally closed to its open position whereby signals can no longer be transmitted between the subscribers equipment 10 and the old switching network 26. Thereafter the E.S.S. network 40 is activated and takes over the function previously served by the network 26 in a manner which is substantially different from that of network 26 but which does not per se constitute part of the present invention.

The entire time for activating all of the cutoff relays 22 in a typical telephone office serving approximately 10,000 subscribers by means of one switching network 26 is less than one and one half minutes during which time there is a loss of service. Immediately thereafter, the E.S.S. network 40 is activated to restore subscriber service. In the event there is a malfunction of the E.S.S. network 40 and it is unable to assume its operating function, the cutover transition switch is then deactivated returning the cutoff relays 22 to their normally closed position and once more reinstituting connection of the subscribers equipment 10 between the frame 14 to the switching network 26. This then permits the malfunction of the E.S.S. network 40 to be corrected whereafter the cutover transition procedure is repeated to once again connect the subscriber equipment 10 between junction 44 of the frame 14 and the E.S.S. network 40.

A particular problem is encountered during the cutover transition by those subscribers who are in the midst of a conversation. In this case their cutoff relays 22 are in an open position and their talk paths 32 are in a closed position. Thus, the activation of the cutover transition switch 38 does not affect them. However, when the E.S.S. network 40 is activated there would be a dial tone present on their lines. To avoid this problem the E.S.S. network 40 is programmed to avoid connection of these particular lines from frame 14 while a conversation is held on these lines. When the subscriber ends his conversation, the talk path 32 is open circuited and the cutoff relay would normally tend to return to its normally closed position; however, it is thereafter maintained in an open condition by the cutover transition switch 38, thereby preventing any further reconnection of this subscriber line to the old switching network 26. After the call has been completed the E.S.S. network 40 places this subscriber line in circuit with its system.

It is to be noted that the method of the present invention thus provides for the simple and easy cutover transition from the old switching network 26 to the new E.S.S. network in a relatively short period of time without causing service disruption to those subscribers talking during cutover transition which disruption could have far reaching disastrous consequences upon the parties requiring service at this particular time. In contradistinction hereto, present cutover transition methods necessitate the cessation of any subscriber conversations and prevent any subsequent return of service for periods up to one-half hour at best and possibly several hours if there is a malfunction of the E.S.S. network.

Figure 2:
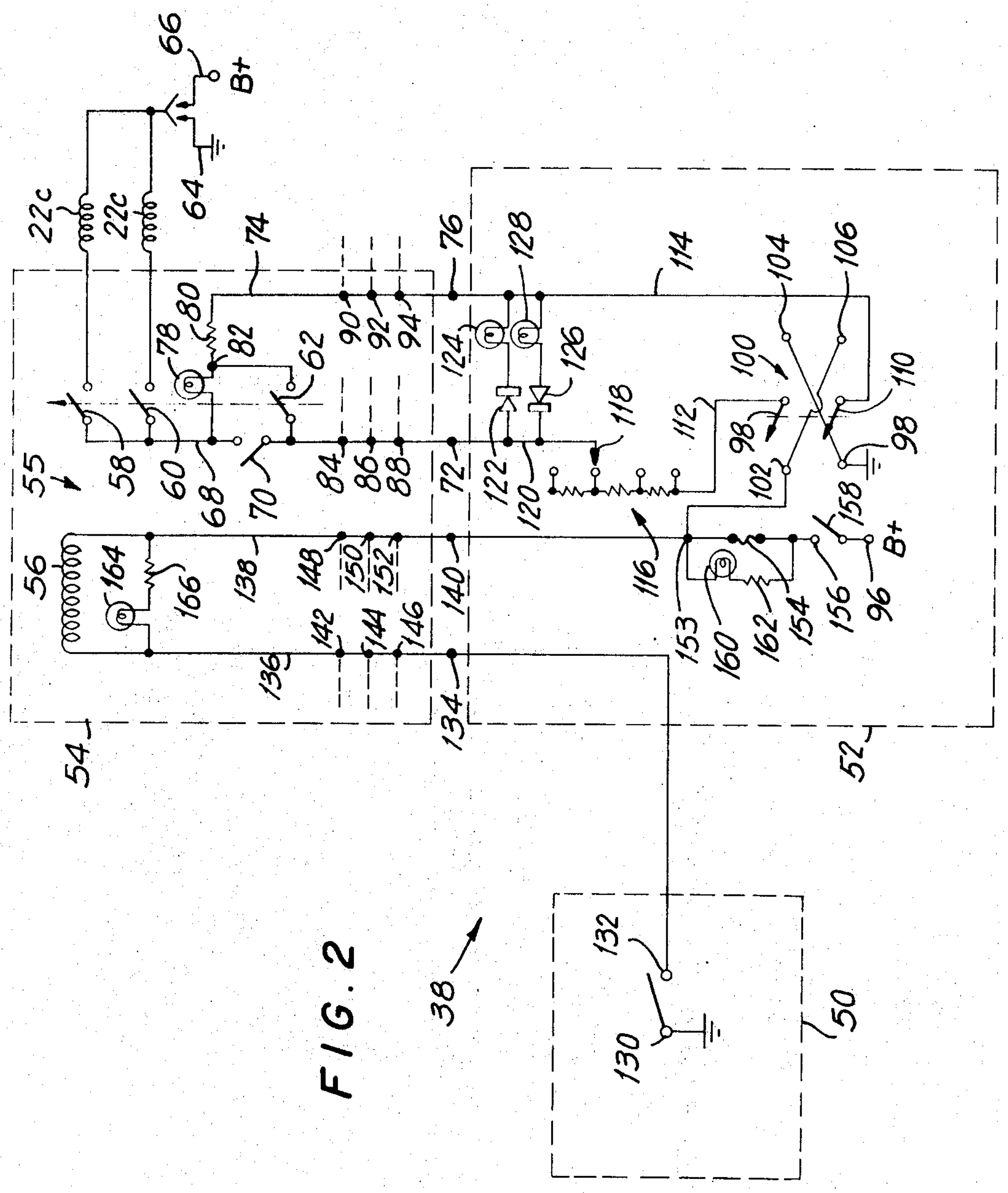
FIG. 2 is a schematic representation of the cutover transition switching apparatus disclosed in FIG. 1.

Referring now to FIG. 2 there is shown a detailed schematic of the cutover transition switch 38. It is herein to be noted that the cutover transition switch 38 is in actuality apparatus which is effective to affect the operation of approximately 10,000 individual cutoff relays within 1½ minutes and in one particular embodiment of the invention, to be described herein, to almost immediately affect the instantaneous operation of 400 cutoff relays.

The transition switch 38 comprises a cutover control switch 50, a power distribution module 52 and a cut-through module 54. The cut-through module 54 essentially comprises a plurality of (preferably 10) solenoid relay switches of the type manufactured by Electronic Controls, Inc. of Wilton, Conn. and designated as a T-Bar relay switch and described in U.S. Pat. No. 3,206,990 and 3,226,508. The relay switch 55 has a coil winding 56 which when energized is adapted to close 48 pairs of normally open contacts, only three of which are shown in FIG. 2 and designated by the refernce numerals 58, 60 and 62. Forty of the pairs of contacts, such as 58 and 60 have one terminal thereof connected to the relay coils 22C of the cutoff relays 22; the coils 22C are also connected to either a ground terminal 64 or a B+ terminal 66 and this is dependent upon the connection of the switching network 26. The other terminal of the contacts is connected to common line 68 which is in turn connected through a switch 70 to a junction 72. The terminals of the remaining eight contacts which are not connected to coils 22C are connected to a common line 74 which is in turn connected to a junction 76. The terminal of switch 70 remote from junction 72 which is connected to common line 68 is connected through the series combination of a lamp 78 and a resistor 80 to the common line 74 with the junction 82 between the series combination being connected to the other terminal of the contacts 62, the purpose of which will be discussed in detail hereinafter. It is herein to be noted that the term "switching member" is intended to include either the cut-through module 54 or the relay switch 55.

Connected to junction 72 via line 68 are junctions 84,86 and 88 while connected to junction 76 via line 74 are junctions 90, 92 and 94. Each of the pairs of junctions 84, 90; 86, 92 and 88, 94 have connected thereto the contact portions of other switches 55 and while only three other pairs of junctions have been illustrated, it is to be noted that in the preferred embodiment of the invention there are actually nine additional pairs of junctions.

The power distribution module includes a B+ terminal 96 and a ground terminal 98. Also includes is a DPDT switch generally designated 100 including the terminal 98 and additional terminals 102, 104 and 106 and wiper 108 and 110. The terminals 98 and 104 are connected together while terminals 102 and 106 are also connected together. The wiper 108 is connected to line 112 while wiper 110 is connected to line 114 which is in turn connected to the junction 76.

The line 112 is connected to a potentiometer 116 whose tap 118 is connected to line 120 which is in turn connected to the junction 72. The potentiometer 116 may have as many preset tap-offs as desired to regulated the current flow through contacts such as 58 and 60 to the coils 22C, as will be discussed hereinafter. Connected from the line 120 to the line 114 is a first series combination of a positively poled diode 122 and a lamp 124 and a second series combination of a negatively poled diode 126 and a lamp 128 with the first and second series combinations being connected in parallel across the lines 114 and 120.

The cutover control switch 50 has one terminal 130 connected directly to ground and the other terminal 132 thereof connected via the power distribution module 52 to a junction 134 which is also connected to one end of the coil winding 56 via a line 136. The other end of the coil winding is connected via a line 138 to the junction 140.

Connected to junction 134 via line 136 are junctions 142, 144 and 146 while connected to junction point 140 via line 138 are junctions 148, 150 and 152. Each of the pairs of junctions 142, 148; 144, 150 and 146, 152 have connected thereto the coil windings of other relay switches 55 and, as discussed previously, while only three other pairs of junctions have herein been shown, it is to be noted that in the preferred embodiment of the invention there are actually nine additional pairs of such junctions equal to the number of additional switches connected in parallel with the depicted switch. However, it will be apparent that either more or less than nine additional switches can be connected in parallel with the depicted switch.

The junction 140 is also connected via a junction 153 and through a fuse 154 to the junction 156 of a switch 158 which switch is connected to the $B^+$ terminal 96. The junction 153 is directly connected to the terminal 102 of the DPDT switch 100. The series combination of a lamp 160 and resistor 162 are connected in parallel across the fuse 154 between the junctions 153 and 156. Similarly, the series combination of a lamp 164 and a resistor 166 are connected in parallel across the coil winding 56.

In the operation of the cutover transition switch 38, it is deemed highly desirable to test the individual components thereof prior to the actual cutover transition. Accordingly, with the DPDT 100 in open condition, the switch 158 is closed to apply $B^+$ to junction 153. Thereafter switch 50 is activated which provides a current flow path through winding 56. If this portion of the apparatus is functioning properly, the light 164 will be lit while lamp 160 remains off. Should fuse 154 fail because of an overload, light 160 will be lit and the reduced current flow through the parallel combination of lamps 164 will render them unlit. However, if this portion of the apparatus checks out, switch 50 is then reopened to cease current flow through winding 56.

With switch 158 still closed, the DPDT switch is then closed in dependence upon the potential existing at the terminals 64 or 66 which is in turn dependent upon the existing connection of old switch network 26. Assuming the coils 22C are connected to the ground terminal 64, it will therefore be necessary to apply a $B^+$ potential to lines 120 and thus line 68. Accordingly, the DPDT switch 100 is closed by connecting the wipers 108 and 110 with terminals 102 and 98, respectively. Thus, $B^+$ is applied to line 114. Irrespective of the setting of potentiometer 116 current will flow through diode 122 and lamp 124, lighting lamp 124. Thereafter switch 70 can be closed to effect lighting of lamp 78. Since switch 50 is open, closure of switch 70 will not cause closure of the contacts 58, 60 and 62. Similarly, if it is desired to leave switch 50 closed, then switch 70 would be left open to prevent premature and undesired activation of the contacts.

It is herein to be noted that the reference to $B^+$ is intended to include any potential either positive or negative with respect to ground; e.g., −48 volts.

After the individual component portions of the switch 38 have been tested as aforesaid and found operative, the actual cutover transition may take place at any time subsequent thereto. This is accomplished by first closing switch 70, next switch 158 is closed thereafter the DPDT switch is closed and the final cutover transition is accomplished by finally closing switch 50 to connect the terminals 130 and 132 together. When this occurs, current flows through the coil winding 56 and closes the normally open contacts, such as 58, 60 and 62, to effect current flow through the coils 22C to cause the normally closed cutoff relays 22 to open. Closure of contact 62 provides a short circuit across lamp 78 and turns the same off. Current flow through lamp 124 indicates that power is flowing and the polarity of the same.

It is herein to be noted that the types of cutoff relays 22 and, more particularly the types of coils 22C, employed in the old switching networks 26 varies in dependence upon the system employed such as panel, crossbar and step-by-step and in some instances from system to system. Thus, it is necessary to provide sufficient current flow through the coils 22C to effect opening of the relays 22 without burning out the coils. It is for this reason that there is provided the potentiometer 116 which enables predetermined current flow through the coils 22C upon closure of the contacts 58 and 60.

In this regard, it is to be noted that the term cutoff relay is intended to include hold magnets which are employed in crossbar systems.

It is also to be noted that in an actual cutover transition where there are approximately 10,000 subscriber lines, that there are employed twenty-five cutover transition switches 38, as described hereinabove. The switches 50 are mounted in a console (not shown) and the entire cutover transition is effected by sequential closure of the twenty-five individual switches 50 which normally takes less than 1½ minutes. If a problem is encountered with the E.S.S. network 40, all that need be done is to reopen the switches 50 to once again place the subscriber equipment 10 in line with the old switching network 26.

It will be apparent to those skilled in the art that if a faster substantially instantaneous cutover transition is required, all of the 25 individual switches 50 can be ganged so that they are operated in unison.

Figure 3:
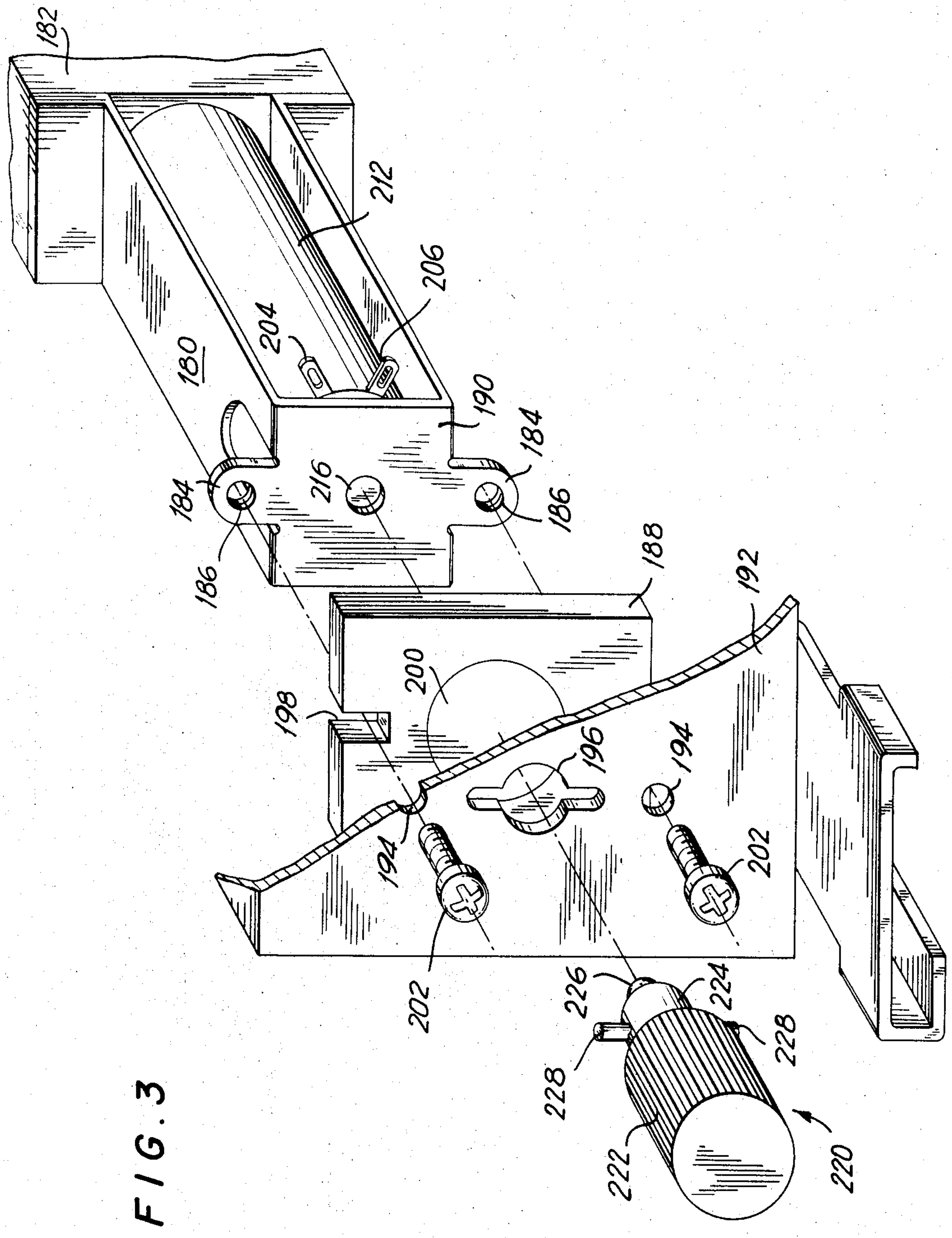
FIG. 3 is an exploded view of the relay switching mechanism schematically illustrated in FIG. 2.
Figure 4:
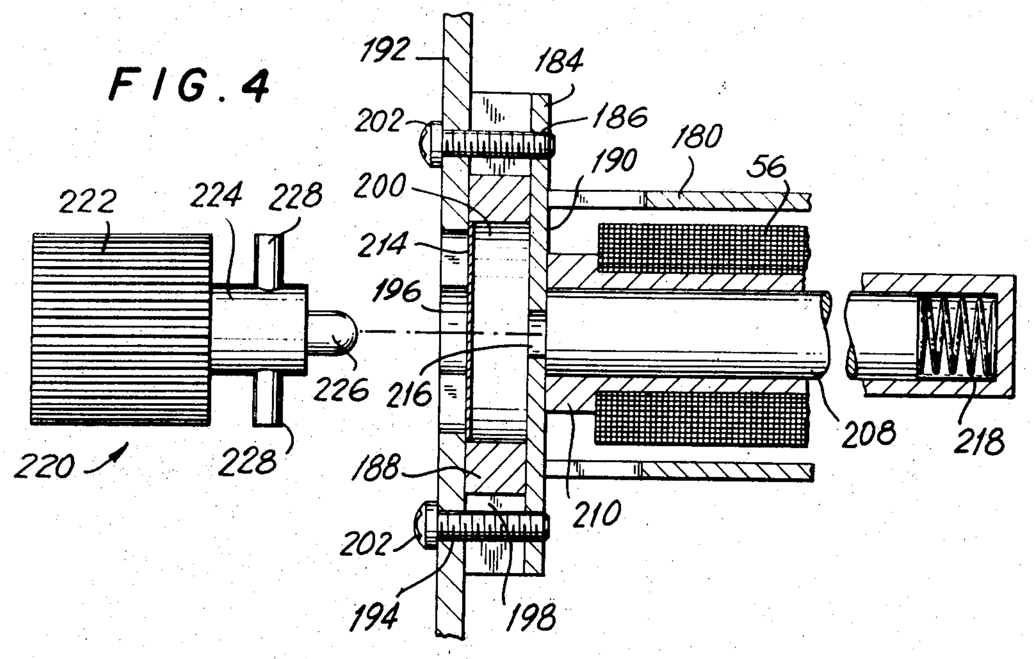
FIG. 4 is a partial longitudinal section view of the relay switching mechanism depicted in FIG. 3 in its inactivated condition.
Figure 5:
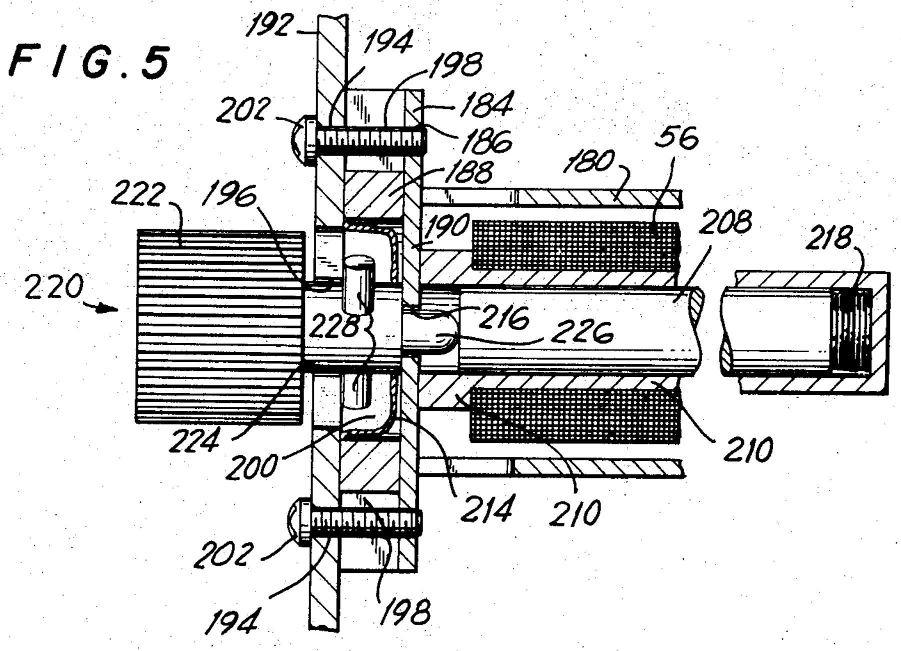
FIG. 5 is a longitudinal sectional view similar to FIG. 4 depicting the relay switching mechanism in its manual override activated condition.

As discussed hereinabove when the contacts and particularly contact 62 closes, the light 78 is short circuited and goes off. However, it is possible that there may be a malfunction of the relay switch 55 which will result in all of the contacts 58, 60 and 62 remaining open which would be indicated by light 78 remaining on after final closure of switch 50. In this event it is highly desirable to provide a manual override to effect closure of the contacts, such an apparatus is depicted in FIGS. 3 through 5.

The relay switch 55 comprises a mounting frame 180 connected to a base 182 which houses the 48 contacts hereinbefore discussed and described in conjunction with FIG. 2 but whose mechanical details of construction are herein omitted for the purpose of clarity and simplification of description of the essential features of this aspect of the present invention. The mounting frame 182 is provided with ears 184 formed by knocking out a portion of the sides of the frame which ears have threaded bores 186 formed therein; the purpose of which will appear hereinafter.

The switch 55 is also provided with a spacer 188 positioned between the top portion 190 of the frame 180 and a mounting cover 192. The mounting is provided with holes 194 and an elongated keyway 196 while the spacer is provided with a pair of slots 198 and a central aperture 200. The frame 180, spacer 188 and mounting cover 192 are secured with respect to one another by means of threaded bolts 202 which pass through the holes 194, the slots 198 and threadedly engage the bores 186.

The switch 55 is provided with a pair of lugs 204 and 206 which are connected to the ends of winding 56 (FIGS. 4 and 5) which lugs are adapted to be connected to a source of activating potential, in the present application a D.C. source with one lug being connected to a $B^+$ terminal and the other lug to a ground terminal. The winding 56 is spaced in surrounding spacial relationship to the armature 208 by means of an insulating sleeve 210. The above assembly is provided with a covering 212 (FIG. 3) to protect the same from the external environment and which has been omitted for the purpose of clarity from FIGS. 4 and 5.

The spacer 188 has a dust cover 214 secured to the front surface thereof in complete surrounding relationship to the aperture 200. The dust cover 214 may comprise a foil member formed of metal or plastic, preferably aluminum, and which may be secured by adhesive bonding or any other suitable manner. It is also possible to secure the foil dust cover to the rear surface of the mounting cover 192 but this is less preferable than securing the same to the spacer 188. The completed assembly is clearly depicted in FIG. 4 from where it can be seen that the dust cover 214 protects the relay switch 55 from tending to become inoperative by dirt or other contaminants entering from the external environment through elongated keyway 196, aperture 200 and a central opening 216 formed in the top portion 190 and whose purpose will be clearly defined hereinafter.

In the normal operation of the relay switch 55, a potential is impressed across the winding 56 via lugs 204 and 206 causing current flow therethrough which causes a magnetic flux which in turn moves the armature 208 to the right, as viewed in FIGS. 4 and 5. This movement of armature 208 overcomes the bias force applied thereto by the armature return spring 218 compressing the same and causing closure of the 48 contacts, as discussed hereinbefore. In the event, however, that there is an electrical failure of the switch 55 or the power connections thereto, it is still desirable to close the contacts. Accordingly, there is also provided a manual override key generally designated 220 comprising a handle portion 222, which in this form of the invention is of cylindrical configuration, including a shank portion 224 having a forwardly extending teat or tip 226 and a pair of lateral flanges 228 extending outwardly of the shank 224; the shank 224, tip 226 and flanges 228 also having substantially cylindrical configurations. However, it is to be noted that the entire override key may be formed of flat stock provided with a tip and a pair of laterally extending flanges.

When it is desired to manually activate the switch 55 the key is inserted through the elongated keyway 196 with the flanges 228 properly positioned. The key is then pushed forward to cause the projecting tip 226 to pierce the dust cover 214 and to project through aperture 200 until it is in abutting engagement with the armature 208. Further forward movement of the key 220 causes the tip 226 to move the armature 208 to the right (as viewed in FIGS. 4 and 5) and to close the contacts of switch 55. After this occurs the key 220 is rotated, either clockwise or counterclockwise and released whereupon the flanges 228 will be in abutting engagement with the rear surface of the mounting cover 192 to thereby maintain the relay switch in a closed contact activated state.

When it is no longer necessary to maintain switch activated, the key 220 is removed by reversing the above steps. The switch 55 may then be disconnected and disassembled for repair at which time a new dust cover 214 is provided on spacer 188 before final reassembly thereof.

It is herein to be noted that the mounting cover 192 is provided with a mounting flange 230 for internal mounting of the switch assembly 55 within the mechanical framework of a cut-through module 54.

Although there has been specifically discussed the method and apparatus of effecting a transition of subscriber lines from an existent switching network to a new electronic switching network (E.S.S.), the invention is also directed to the problem of area transfers, as discussed briefly hereinbefore. In the case of area transfers, it is sometimes necessary or desirable to switch a predetermined number of selected subscriber lines from one type of existent generation switching system to another type of existent generation switching system; e.g., from a crossbar system to a panel system or from one panel system to another panel system. Of course, the method and apparatus hereinbefore discussed would be precisely the same.

While reference has herein been directed to subscriber lines, it will be appreciated by those skilled in the art that the same is intended to include PBX trunk lines.

It is thus seen that I have provided a new and novel method and apparatus for easily and assuredly effecting the electrical cutover transition within a central telephone office from an old switching network to a new either similar or different switching network which is accomplished in a minimal amount of time with minimal problems and wherein there is provided a new and novel fail-safe operating mechanism to permit manual override in the problematic event of failure of electrical operation of the switch mechanism employed.

While I have shown and described the various preferred embodiments of the invention, it will be readily apparent to those skilled in the art that there are a multitude of changes, improvements and modifications which may be made therein without departing from the spirit and scope thereof.

I claim:

1. In a solenoid operated switch including a base portion having at least one pair of contacts mounted therein and a solenoid having a coil wound therearound in spaced insulative relationship and mounted upon said base portion, the improvement comprising a frame mounted upon said base portion, said frame including a top portion having an opening therein disposed in superposed spaced coaxial alignment with said solenoid, spring biasing means for maintaining said solenoid in a deactuated condition, a dust cover secured with respect to said frame to cover said opening, a separable key member having a tip which is adapted to be piercably inserted through said dust cover and into said opening to engage said solenoid to overcome the force of said spring biasing means and to cause actuation of said solenoid to effect the manual activation of said switch and said contacts, and said separable key member being effective to maintain said switch in an activated condition until said key member is removed.

2. The improvement in accordance with claim 1, including means connected to said frame to secure said key member in a position wherein the tip thereof maintains said solenoid in an actuated position.

3. The improvement in accordance with claim 2, wherein said connecting means includes a cover member, and a spacer member, said spacer member having an enlarged opening in substantial coaxial alignment with said opening in the top portion of said frame and disposed in abutting engagement with said frame, said cover member being disposed in abutting engagement with said spacer member and having an elongated aperture formed therein, means for securing said cover member with respect to said frame, said elongated aperture being disposed in substantially coaxial alignment with the enlarged opening in said spacer member and said opening in the top portion of said frame, and said key member having a pair of lateral flanges extending therefrom,whereby insertion of said forward tip and lateral flanges thereof through said elongated aperture and the subsequent rotation thereof results in the key member being secured in position with the forward tip maintaining said solenoid in an actuated position.

4. The improvement in accordance with claim 3, wherein said key member comprises a shank portion having said lateral flanges extending therefrom and having said tip extending forwardly thereof, and said elongated aperture of said cover member having a keyway configuration wherein the central portion thereof accommodates said key member shank portion and said lateral dimension accommodates said key member lateral flanges.

5. The improvement in accordance with claim 3, wherein said cover member includes a longitudinal portion surrounding said frame and said solenoid.

6. The improvement in accordance with claim 5, wherein said dust cover is interposed between the top portion of said frame and said spacer member in surrounding relationship to the coaxial openings therein.

7. The improvement in accordance with claim 6, wherein said dust cover comprises a substantially planar foil member.

8. The improvement in accordance with claim 7, wherein said foil is aluminum.

* * * * *